US012612818B1

(12) United States Patent
Friedli et al.

(10) Patent No.: US 12,612,818 B1
(45) Date of Patent: Apr. 28, 2026

(54) ACCESS CONTROL SYSTEM WITH A SLIDING DOOR THAT CAN BE OPENED FROM THE INSIDE WITHOUT CONTACT

(71) Applicant: INVENTIO AG, Hergiswil (CH)

(72) Inventors: Paul Friedli, Remetschwil (CH); Jonas Vonaesch, Lucerne (CH)

(73) Assignee: Inventio AG, Hergiswil (CH)

( * ) Notice: Subject to any disclaimer, the term of this patent is extended or adjusted under 35 U.S.C. 154(b) by 339 days.

(21) Appl. No.: 17/469,847

(22) PCT Filed: Mar. 2, 2020

(86) PCT No.: PCT/EP2020/055409
§ 371 (c)(1),
(2) Date: Nov. 22, 2024

(87) PCT Pub. No.: WO2020/182512
PCT Pub. Date: Sep. 17, 2020

(30) Foreign Application Priority Data

Mar. 8, 2019 (EP) .................................... 19161665

(51) Int. Cl.
*E05F 15/73* (2015.01)

(52) U.S. Cl.
CPC ......... *E05F 15/73* (2015.01); *E05Y 2900/132* (2013.01)

(58) Field of Classification Search
None
See application file for complete search history.

(56) References Cited

U.S. PATENT DOCUMENTS 3,497,995 A * 3/1970 Forsberg ................. E05F 15/73 49/31
6,304,178 B1 10/2001 Hayashida
(Continued)

FOREIGN PATENT DOCUMENTS

CA 3053225 A1 * 10/2018 ............. E05F 15/73
CN 103168317 A 6/2013
(Continued)

OTHER PUBLICATIONS

"Gesichtserkennung"; Bundesamt für Sicherheit in der Informationstechnik; Jan. 27, 2017; pp. 1-6.
(Continued)

*Primary Examiner* — Catherine A Kelly
(74) *Attorney, Agent, or Firm* — Wiggin and Dana LLP

(57) ABSTRACT

The invention relates to a system for controlling access to a restricted-access area in a building, which system has a sliding door system and a controller for the sliding door system. The sliding door system has a door frame and a sliding door which can be moved in the door frame between a closed position and an open position by a drive unit. The door frame has a passage region and a wall shell region which at least partially accommodates the sliding door in the open position. A controller is arranged on the sliding door and is communicatively connected to the drive device. The controller is designed to control a movement of the sliding door between the closed position and an open position. An activation device is arranged in an interior of the sliding door and is communicatively connected to the controller. The activation device is designed to generate an activation signal (AS) when a user who wishes to leave the restricted-access zone approaches the sliding door within a specified distance. The controller is designed to cause the sliding door to move
(Continued)

from the closed position to the open position when an activation signal (AS) is present.

11 Claims, 3 Drawing Sheets

(56) References Cited

U.S. PATENT DOCUMENTS

| | | | | |
|---|---|---|---|---|
| 7,362,224 | B2 * | 4/2008 | Zambon | G01J 5/14 374/E17.002 |
| 7,984,590 | B2 | 7/2011 | Hoshide et al. | |
| 10,443,294 | B2 * | 10/2019 | Goldmann | E05F 15/76 |
| 10,954,711 | B2 * | 3/2021 | Mayr | B60R 25/2054 |
| 11,012,068 | B2 * | 5/2021 | Sawada | G01V 3/088 |
| 11,434,683 | B2 * | 9/2022 | Sabatini | E05B 81/76 |
| 11,993,974 | B2 * | 5/2024 | Friedli | E05F 15/632 |
| 12,123,247 | B2 * | 10/2024 | Vonaesch | E05F 15/632 |
| 2014/0182206 | A1 | 7/2014 | Yenni et al. | |
| 2014/0267739 | A1 | 9/2014 | Ibsies | |
| 2018/0016836 | A1 | 1/2018 | Ibsies | |

FOREIGN PATENT DOCUMENTS

| | | | | |
|---|---|---|---|---|
| CN | 104278908 | A | 1/2015 | |
| CN | 105569502 | A | 5/2016 | |
| CN | 206190137 | U | 5/2017 | |
| CN | 107916866 | A | 4/2018 | |
| CN | 208430942 | U | 1/2019 | |
| DE | 10163061 | A1 | 6/2003 | |
| EP | 0554492 | A1 | 8/1993 | |
| EP | 2025854 | A2 | 2/2009 | |
| EP | 2418517 | A2 | 2/2012 | |
| EP | 1681424 | B1 | 3/2013 | |
| EP | 2506034 | B1 | 5/2013 | |
| EP | 2558977 | B1 | 4/2015 | |
| EP | 2876241 | A1 | 5/2015 | |
| EP | 2418517 | A3 | 3/2017 | |
| ES | 2662701 | A1 | 4/2018 | |
| KR | 20130116327 | A * | 10/2013 | B60R 25/2054 |
| WO | 2005048200 | A2 | 5/2005 | |
| WO | WO-2006033145 | A1 * | 3/2006 | E05F 15/73 |
| WO | WO-2009088361 | A1 * | 7/2009 | H03K 17/962 |
| WO | 2009139016 | A2 | 11/2009 | |
| WO | 2010112586 | A1 | 10/2010 | |
| WO | 2014019937 | A1 | 2/2014 | |
| WO | 2014030167 | A2 | 2/2014 | |
| WO | 2018069341 | A1 | 4/2018 | |
| WO | 2018178054 | A1 | 10/2018 | |

OTHER PUBLICATIONS

Prof. Martinetz, Thomas; "Gesture-Based Interaction with Time-of-Flight Cameras"; Doctoral Dissertation; University of Lubeck; 2010; pp. 1-177.

* cited by examiner

ACCESS CONTROL SYSTEM WITH A SLIDING DOOR THAT CAN BE OPENED FROM THE INSIDE WITHOUT CONTACT

CROSS-REFERENCE TO RELATED APPLICATIONS

This application is the national phase application under 35 U.S.C. § 371 claiming the benefit of priority based on International Patent Application No. PCT/EP2020/055409, filed on Mar. 2, 2020, which claims the benefit of priority based on European Patent Application No. 19161665.5 filed on Mar. 8, 2019. The contents of each of these applications are hereby incorporated by reference in their entirety.

FIELD OF THE INVENTION

The technology described here relates generally to an access control system for a building. Embodiments of the technology relate in particular to an access control system comprising a building sliding door and to a method for operating the access control system.

BACKGROUND OF THE INVENTION

Access control systems can be designed in the most varied of ways in order to grant or deny people access to a restricted area. The embodiments may relate, for example, to the way in which persons (users) must identify themselves as authorized to enter, e.g., using a key, a magnetic card, a chip card or an RFID card or using a mobile electronic device (e.g., mobile phone). WO 2010/112586 A1 describes an access control system in which a user who is authorized to enter is shown an access code on a display on a mobile phone. If the user holds the mobile phone up to a camera such that said camera can capture the displayed access code, the access control system grants the user access if the access code is valid.

The design of an access control system can also relate to the way in which access is granted or denied to people, for example through doors, locks or barriers. It is known, for example, that an electronic lock is arranged on a door, at which an access code must be entered so that the door can be unlocked and opened. In addition to this unlocking function on a door, it is known to monitor passage through the door. WO 2018/069341 A1 describes, for example, a device that uses sensors to monitor whether and which users pass through a door. To monitor users by means of infrared image recording and infrared pulse lighting, the device has a stereometric user recognition device consisting of a radiation source and an image recording device, which is fastened in a stationary manner near a wall or a door frame. The user recognition device determines the geometric dimensions of a user (person, car) in order to determine how far the door needs to be opened for the user to pass through. The aim is to ensure the comfort and safety of the passing user; for example, a person walking or driving should feel safe when passing through the door.

The systems mentioned relate to different requirements of access control and related designs of access control systems. In addition to these known requirements, there are further requirements, for example a person who is already in a restricted-access zone should be able to leave it quickly, safely and comfortably, in particular also in an emergency. There is therefore a need for technology for an access control system that meets these requirements, with this technology having to take into account, in particular, the aspect of leaving without negatively affecting the comfort for users.

SUMMARY OF THE INVENTION

One aspect of such technology relates to a system for controlling access to a restricted-access area in a building. The system has a sliding door system and a controller for the sliding door system. The sliding door system has a door frame and a sliding door which can be displaced in the door frame between a closed position and an open position by a drive device. The door frame has a passage region and a wall shell region which at least partially accommodates the sliding door in the open position. A controller is arranged on the sliding door and is communicatively connected to the drive device. The controller is designed to control a movement of the sliding door between the closed position and an open position. An activation device is arranged in an interior of the sliding door and is communicatively connected to the controller. The activation device is designed to generate an activation signal when a person who wishes to leave the restricted-access zone approaches the sliding door up to a specified distance. The controller is designed to initiate a movement of the sliding door from the closed position into an open position when an activation signal is present.

Another aspect of the technology relates to a method for operating a system for controlling access to a restricted-access area in a building. The system comprises a sliding door system and a controller for the sliding door system. According to the method, an activation signal is generated by an activation device which is arranged in an interior space of a sliding door of the sliding door system and is communicatively connected to the controller. The activation device is designed to generate the activation signal when a person who wishes to leave the restricted-access zone approaches the sliding door up to a specified distance. According to the method, a drive unit of the sliding door system is also activated by the controller when an activation signal is present in order to initiate a movement of the sliding door from the closed position into a first open position.

The technology described here creates an access control system that opens the sliding door without contact for a user who wants to leave the restricted-access zone. Such a situation exists, for example, when the user wants to leave his home or another room; i.e. the user wants to go from inside the home to the outside into the public zone. The user only has to approach the sliding door up to a specified distance from the inside for the system to initiate the opening of the sliding door. The approach can also consist in the user stretching out a hand in the direction of the sliding door, for example. The user can also use this to express his intention to leave the restricted-access zone.

In one embodiment, the sliding door has an inner door face facing the restricted-access area and an outer door face facing away from the restricted-access area. The interior space in which the activation device is arranged and which detects an approach to the inner door face extends between the inner door-leaf face and the outer door face. The inner door face thus points into the interior of the home, for example. The activation device arranged in the interior of the sliding door is covered by the inner door face and cannot be seen from inside the home.

In one embodiment, the activation device has a first proximity sensor and a processing device connected thereto, wherein the processing device is communicatively connected to the controller. A proximity sensor, also referred to as a proximity switch, reacts to an approach, i.e. without direct contact, and can—depending on the application—be designed according to one of different measuring principles, e.g. as an inductive or capacitive proximity sensor.

In the embodiments mentioned in this description, the first proximity sensor is designed as a capacitive proximity sensor. The capacitive proximity sensor comprises a first conductive field plate which is arranged in the interior space on the inner door face. The field plate can thus be arranged in a space-saving manner and not visible from the outside. Nevertheless, a change in capacitance can be detected when the user approaches the sliding door, e.g. from the inside of the apartment.

In a further embodiment, the activation device has a second proximity sensor which is connected to the processing device. The second proximity sensor comprises a second capacitive proximity sensor with a second conductive field plate. The second conductive field plate is also arranged in the interior on the inner door face. As a result, the system can be designed for different applications.

In one embodiment, the first proximity sensor and the second proximity sensor are designed to detect an approach of the user and each generate a detection signal. The processing device is designed to process at least one of the detection signals, i.e. both detection signals can be processed or only one of the two.

In one embodiment, both detection signals can be processed if the first and second field plates are arranged substantially horizontally next to one another at a specified distance. As a result, a first point in time at which a first detection signal is determined can be determined, wherein the first detection signal is generated by one of the two proximity sensors. In addition, a second point in time can be determined at which a second detection signal is determined, wherein the second detection signal is generated by the other of the two proximity sensors. A direction of movement can be determined from the comparison of the points in time determined.

One of the two detection signals can be processed in one embodiment if the first field plate and the second field plate are arranged at different heights on the inner door face. As a result, the access control system can be adapted to different circumstances and user requirements (e.g. automatic door opening for pets, in particular during a specified period).

In one embodiment, the method also includes generating a second activation signal when the user performs a specified gesture. If there is a second activation signal, the drive unit is activated by the controller in order to initiate a movement of the sliding door from the first open position into a second open position. In this way it can be prevented, for example, that the sliding door 4 is unintentionally opened so far that a user can pass if the user is unintentionally too close to the sliding door.

In the technology described here, it is an advantage that, in particular, the activation device, the controller, and the drive device are arranged on the sliding door and are moved along with it. As a result, maintenance and/or repair work can be carried out with relatively little effort; for example, the sliding door can be entirely or partially removed from the door frame in order to gain access to the components arranged on the sliding door. This also makes it possible to replace a defective sliding door with a new sliding door or a temporary replacement sliding door while the defective sliding door is being repaired in a workshop.

The technology described here also has an advantage that its use is not restricted to a specific type of sliding door system. In one embodiment, the sliding door can comprise an actuator which is designed to position the door faces in a first position with a first face spacing when the sliding door is in the closed position and in a second position with a second face spacing when the sliding door is in the open position. The first face spacing is greater than the second face spacing.

BRIEF DESCRIPTION OF THE DRAWINGS

Various aspects of the improved technology are described in greater detail below with reference to embodiments in conjunction with the drawings. In the drawings, identical elements have identical reference signs. In the drawings.

DETAILED DESCRIPTION OF EMBODIMENTS OF THE INVENTION

Figure 1:
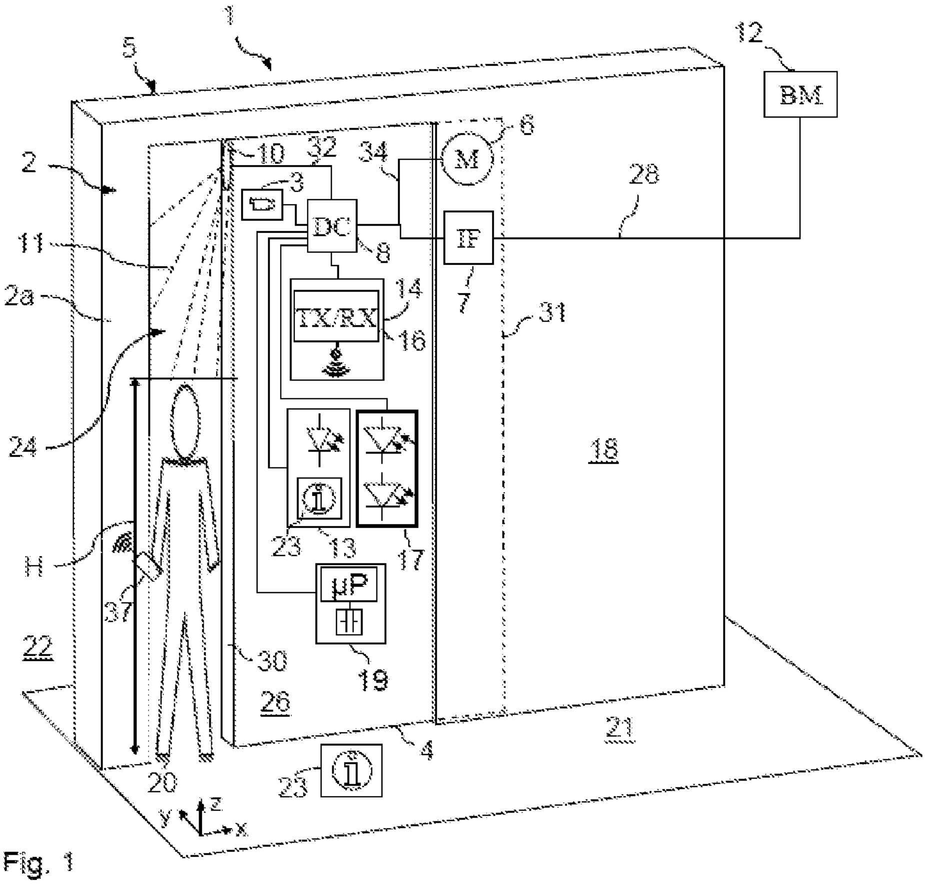
FIG. 1 is a schematic illustration of an exemplary situation in a building having an access control system according to one embodiment.

FIG. 1 is a schematic illustration of an exemplary situation in a building having an access control system 1 which comprises a sliding door system 5 and a controller 8 (DC) controlling the sliding door system 5. The sliding door system 5 is inserted into a building wall and represents a physical barrier between a public area 21 and a restricted-access area 22. In relation to the x-y-z coordinate system drawn in FIG. 1, the building wall extends in a plane that is spanned by the x and z axes. The restricted-access area 22 can be, for example, an apartment, an office or another space in a building. The sliding door system 5 can be inserted into a building's inner wall (for access control within the building, e.g., access to an apartment) or in a building's outer wall (for controlling access to the building). As explained in more detail elsewhere in this description, the sliding door system 5 opens a sliding door 4 for a user 20 who is authorized to enter, whereas it remains closed for a user 20 not authorized to enter. The term "building" in this description is to be understood as meaning residential and/or commercial buildings, sports arenas, airports or ships, for example.

In the situation shown in FIG. 1, embodiments of the technology described here can be used in an advantageous manner in order to operate the access control system 1 with the highest possible degree of security, although the user 20 can nevertheless be granted access to the restricted-access area 22 comfortably. In addition, the technology described here allows the user 20 to comfortably leave the restricted-access zone 22. Summarized briefly and by way of example, the access control system 1 according to one embodiment is operated as follows: if the user 20 is in the restricted-access zone 22 and intends to leave it, this is recognized according to one embodiment of the technology and the sliding door 4 is opened without the user 20 having to touch the sliding door 4, a door handle, a door key or the like. An activation device 19 detects the intention of the user 20 by means of a proximity sensor and causes the sliding door 4 to be opened.

The sliding door system 5 shown in FIG. 1 comprises a door frame 2 and the sliding door 4. The door frame 2 has a passage region 24 and a wall shell region 18 which is designed to at least partially accommodate the sliding door 4. For this purpose, the wall shell region 18 has a structure which forms a cavity which is dimensioned so as to accommodate the sliding door 4. The passage region 24 is the region in the building wall in which it is possible to pass through from one area (21, 22) to the other area (21, 22) along the y-axis; the passage region is between a vertical frame part 2*a* (door post) and the opposite wall shell region 18. Depending on the design, the wall shell region 18 is accommodated in a cavity in the building wall, or the wall shell region 18 can be regarded as part of the building wall, perhaps in the manner of cladding.

Figure 2A:
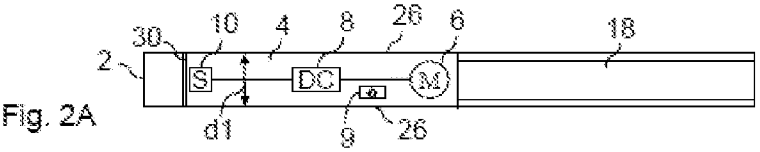
FIG. 2A is a schematic illustration of an exemplary sliding door system in which the sliding door is closed.
Figure 2B:
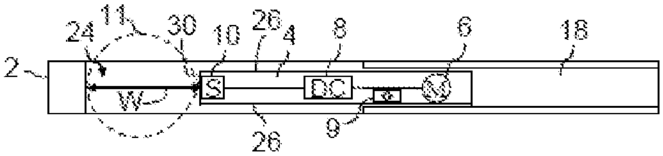
FIG. 2B is a schematic illustration of the sliding door system from FIG. 2A in which the sliding door is in an intermediate position.
Figure 2C:
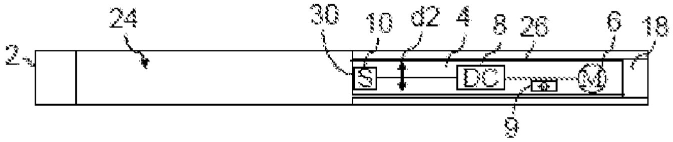
FIG. 2C is a schematic illustration of the sliding door system from FIG. 2A in which the sliding door is in an open position.

The sliding door 4 is displaceable in the door frame 2 between a closed position shown in FIG. 2A and an open position shown in FIG. 2C. In relation to the x-y-z coordinate system drawn in FIG. 1, the sliding door 4 is displaced along the x-axis. In the open position shown in FIG. 2C, the sliding door 4 is substantially located within the wall shell region 18 in one embodiment. Between these maximum positions, the sliding door 4 can assume an intermediate position shown in FIG. 1 and FIG. 2B, in which the sliding door 4 (and correspondingly the passage region 24) is open to a lesser or greater extent, i.e., an end face 30 of the sliding door 4 has a variable distance from the frame part 2*a*. This variable distance is shown as the opening width W in FIG. 2B.

The sliding door 4 has two substantially parallel door faces 26 (on an inner side and an outer side of the sliding door 4, respectively). The inside of the sliding door 4 faces the restricted-access area 22, and the outside of the sliding door 4 faces the public area 21. Correspondingly, the door face 26 on the inside is designated as the inner door face 26 and that on the outside as the outer door face 26. The door leaves 26 are spaced apart from one another (in the y-direction) such that there is an inner space between the door faces 26 in which system components and insulating material for soundproofing and fire protection can be arranged as needed. The door faces 26 are connected to one another in the region of the end face 30, as shown for example in FIG. 2A. Each of the door faces 26 extends parallel to the x-z plane.

In addition to the aforementioned controller 8 and activation device 19, FIG. 1 shows a recognition device 14, an interface device 7, a sensor device 10, a camera device 3 for facial recognition, a light projection device 13, a detection device 17, and a drive device 6 (M), which are the components in one embodiment of the sliding door system 5. In the following, embodiments are described using the access control system 1 shown in FIG. 1 and its system components. A person skilled in the art will recognize that one or more of these system components can be optional; i.e. depending on the requirements in the building, the light projection device 13 and/or the activation device 19 are omitted, for example. Instead, for example, alternative facilities are used, for example, optoelectronic displays, electromechanical displays, door handles or door key systems. For example, an activation device 19 can be present in one embodiment, but no light projection device 13. If a display of information is desired in this embodiment, for example, a display can be provided. The person skilled in the art recognizes that this applies analogously to other system components.

In one embodiment, the sliding door system 5 is connected to a building management system 12 (BM); in the embodiment shown in FIG. 1, this connection is established by means of a communication network 28 to which the building management system 12 and the interface device 7 are coupled. A person skilled in the art would recognize that the building management system 12 can be entirely or partially outsourced to an IT infrastructure for cloud computing (also known as the "cloud" in colloquial terms). This includes, for example, storing data in a remote data center, but also executing programs that are not installed locally but rather remotely. Depending on the design, a certain functionality can be made available, for example, in the controller 8 or via the "cloud." For this purpose, a software application or program parts thereof can be executed in the "cloud," for example. The controller 8 then accesses this infrastructure via the interface device 7 as required in order to execute the software application.

The communication network 28 can comprise an electronic bus system in an execution system. In one embodiment, the electrical connection of the sliding door system 5, including its supply with electrical energy, is established via the interface device 7. A person skilled in the art would recognize that a plurality of sliding door systems 5 can be provided in the building and that each of these sliding door systems 5 is coupled to the communication network 28 in order to communicate with the building management system 12, for example in conjunction with determining and checking access authorizations, if this is carried out centrally by the building management system 12.

The controller 8 is connected to the sensor device 10 by an electrical connection 32. The controller 8 is also connected to the drive device 6 and the interface device 7 by means of an electrical connection 34. The electrical connections 32, 34 are designed for signal and/or energy transmission; for this purpose, they can each comprise individual electrical lines or an electrical bus system.

The controller 8 is also connected to the camera device 3 and the recognition device 14. With the aid of the camera device 3 and/or the recognition device 14, it can be determined in one embodiment whether the user 20 is authorized to gain access to the restricted-access area 22. If the determination shows that the user 20 has access authorization, the controller 8 causes the sliding door 4 to be opened. A person skilled in the art recognizes that, depending on the requirements in the building, both or only one of the named devices (camera device 3, recognition device 14) can be present in the access control system 1.

The camera device 3 comprises a camera, e.g., a digital camera, a storage device, and an image processing module. The image processing module is configured to carry out a computer-aided method for image processing. Image processing methods are known, for example from U.S. Pat. No. 8,494,231 B2. A basic representation of the image processing for the purpose of facial recognition is described in the publication "Gesichtserkennung" ["Facial Recognition"] of the German Federal Office for Information Security (available under the topic of biometrics at the Internet address www.bsi.bund.de). This publication distinguishes between the three main steps “Create template,” “Create reference dataset” and “Compare facial images.” In order to make the comparison of two facial images as simple and quick as possible, the features of a face are ascertained and stored in the form of a feature dataset referred to as a “template.” When the face on an image of a user has been found and standardized, features in addition to the eyes, nose, and mouth/chin are sought, measured, and related to each other. These extracted features are encoded, compressed, and stored as a feature dataset (template). The similarity of the templates of two facial images are defined by combining them using a mathematical algorithm. This results in a degree of similarity of the templates. If the result is within certain tolerance limits, the two templates, and thus their underlying facial images, are classified as identical.

Various situations can arise on the sliding door system 5; the user 20 may want to enter the restricted-access area 22 or want to leave it. In an exemplary situation, the user 20 is in the public area 21 and approaches the sliding door 4 in order to enter the restricted-access area 22. In one embodiment, the approach activates the camera device 3, which then determines a facial template from an image recording of the user 20 and compares it with stored templates of users with access authorization. The person skilled in the art recognizes that the image recording can be displayed on a display device (for example video monitor), for example in connection with a (video) door intercom system, in the restricted-access area 22. Depending on the configuration, the image recording can also be saved.

A person skilled in the art recognizes that the camera device 3 can also be designed to record other biometric features (e.g., iris/retina pattern, pattern of a fingerprint).

The recognition device 14 is designed to capture credentials from the user 20, on the basis of which the access control system 1 can determine the access authorization of the user 20. The credentials can, for example, be in the form of a physical key, a manually entered password (e.g., a PIN code), a biometric feature (e.g., fingerprint, iris pattern, speech/voice characteristics) or an access code captured on a magnetic card, chip card or RFID card or an electronic device (NFC, Bluetooth or cellular network-based). The user 20 presents the credentials when they wish to access the restricted-access area 22.

Corresponding to the mentioned forms which the credentials can take, the credentials can be presented in different ways, for example by a conscious manual action (e.g., entering a PIN code or holding out an RFID card) or by approaching the door to reach within radio range of the recognition device 14 (e.g., to establish a Bluetooth connection). The recognition device 14 can be arranged on the sliding door 4, on the door frame 2 or in the vicinity thereof; it can be arranged, for example, in the interior of the sliding door 4 such that it can capture the credentials if the user 20 is in the public area 21.

The recognition device 14 is designed according to the credentials provided in the access control system 1. This means that the recognition device 14 has, for example, a door cylinder, a device for capturing a biometric feature, a device for capturing an optical code, a reader for a magnetic stripe card or a chip card, a keypad or a touch-sensitive screen for manually entering a password, or a transceiver for radio signals. A person skilled in the art would recognize that, in one embodiment, the sliding door system 5 can have more than one recognition device 14, each for a different type of credentials, or that one recognition device 14 is designed for several types of credentials.

The person skilled in the art also recognizes that a detection device 14 arranged on the sliding door 4 is designed or arranged such that the sliding door 4 can be moved into the wall shell region 18. The detection device 14 can be arranged for this purpose in the interior of the sliding door 4; it can also be arranged in the region of the end face 30 if this region does not extend into the wall shell region 18 in the open position.

In the embodiment shown in FIG. 1, the recognition device 14 captures credentials, which a radio device 37 carried by the user 20 transmits as a radio signal. The radio signal can be sent in accordance with a known standard for radio communication (e.g., RFID, WLAN/WiFi, NFC, Bluetooth). Accordingly, the recognition device 14 is designed to receive such a radio signal; for this purpose, a transceiver 16 and an antenna connected thereto are shown in FIG. 1. The person skilled in the art recognizes that when radio signals are used, the door faces 26 are permeable to them.

The transceiver 16, alone or in conjunction with the controller 8, determines the credentials from the received radio signal, which is then used to determine the access authorization. If the credentials are valid, the user 20 can be granted access. If the credentials are not valid, access is denied and the sliding door 4 is closed.

Figure 3:
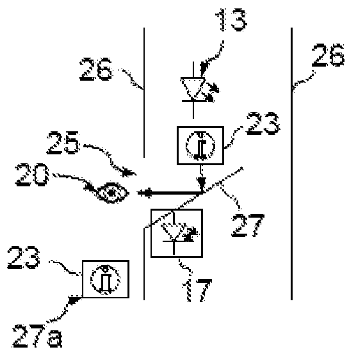
FIG. 3 is a schematic representation of an embodiment of a light projection device of a sliding door, which is used in the embodiment of an access control system shown in FIG. 1.
Figure 4:
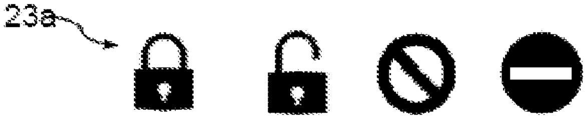
FIG. 4 shows schematic representations of exemplary pictograms which can be generated by the light projection device shown in FIG. 3.

Depending on whether the user 20 has authorization for access or not, this can be communicated to the user 20 in one embodiment by means of corresponding status information 23. In one embodiment, the status information is communicated by the light projection device 13, which projects the status information 23 onto a projection surface. As indicated in FIGS. 1 and 3, the projection surface can be provided on the sliding door 4; alternatively or additionally, the projection surface can be a floor surface (in the public area 21) in front of the sliding door 4. As indicated in FIG. 4, the status information 23 can be represented by one or more pictograms 23*a*, for example by a closed or opened padlock. Further details on the light projection device 13 are disclosed in connection with FIGS. 3 and 4.

In one embodiment, the sliding door 4 does not open immediately after the user 20 is recognized as having access authorization by means of the camera device 3 and/or the recognition device 14. Depending on the building situation, it may not be desirable, for example, for the sliding door 4 to open if the user 20 is recognized as having access authorization, but does not currently want access, and merely walks past the sliding door 4. Such a situation can exist, for example, in a building corridor with a number of adjacent rooms (e.g., offices, hospital rooms); the user 20 (e.g., supervisor, doctor) can in principle be authorized to access all rooms, but at a certain point in time the user 20 can actually only want access to one of these rooms.

The detection device 17 serves to recognize such an intention; in one embodiment, the intention can be expressed in that the user 20 has to perform a conscious action for this, for example has to go very close to the sliding door 4 or has to stretch out a hand. As indicated in FIG. 1, in one embodiment the detection device 17 comprises an optical detection device which detects the conscious action. The detection device 17 detects, for example, that the user 20 is stretching out his hand. In one embodiment, the detection device 17 comprises a light barrier which is designed such that the hand interrupts a light path between a light source and a light receiver. Further details according to one embodiment of the detection device 17 are disclosed in connection with FIG. 3.

The person skilled in the art recognizes that, as an alternative to a light barrier, the detection device 17 can have a sensor based on a different principle, for example a laser scanner, a camera, a radar sensor, a capacitive sensor, a time-of-flight sensor or the like.

FIG. 3 shows a schematic illustration of an embodiment for the light projection device 13 which is used in the exemplary embodiment of the access control system 1 shown in FIG. 1. Part of the sliding door 4 is shown in cross section (y-z plane), wherein the outer door face 26 (left) and the inner door face 26 (right) and the interior space in between are shown. The location of the user 20 is indicated by an eye, where the user 20 is looking at a control compartment 25 which is present on the outer door face 26. In the embodiment shown, the control compartment 25 is formed by a cutout in the outer door face 26 and extends into the interior of the sliding door 4. In the control compartment 25 there is a projection surface 27 arranged obliquely in the vertical direction, for example it extends obliquely upwards from the perspective of the user 20.

As indicated in FIG. 3, the light projection device 13 is arranged in the interior above the projection surface 27. From there, the status information 23 is projected onto the projection surface 27 and is visible to the user 20. An exemplary light path is indicated by an arrow pointing downwards and a horizontal arrow pointing outwards. In FIG. 3 it is also indicated that the status information 23 can be projected onto the floor (in the public area 21) in front of the sliding door 4. In one embodiment, the light projection device 13 comprises a laser scanner which projects the status information 23 onto the projection surface 27 by means of laser radiation. Such laser scanners are commercially available, e.g., a microscanner from Bosch Sensortec GmbH, Germany.

In one embodiment, the light projection device 13 is designed to project an input field onto the projection surface 27, 27*a*. The input field can for example comprise a keyboard and/or symbols on which the user 20, for example, can enter or select a PIN code or a symbol (e.g., a key symbol to unlock or lock). In this embodiment, the light projection device 13 is designed similarly to a known device that for example allows a computer keyboard or a piano keyboard to project onto a surface. In such a device, a laser projects the keyboard and a camera detects finger movements. An evaluation program detects the coordinates of the finger movements and assigns them to corresponding keys and/or symbols. A device for the optical input of commands is for example disclosed in EP 0 554492 A1.

A light projection device 13 configured in this way makes it possible to determine the action of the user 20 on the basis of the "touched" field (button or symbol). A separate detection device 17 may possibly be omitted. Correspondingly, a field can also be "touched" when the input field is projected onto the floor in front of the sliding door 4; the "touching" can for example be done with a foot.

As mentioned above, the status information 23 can be represented by pictograms 23*a*, symbols and/or text. FIG. 4 shows exemplary icons 23*a*; from left to right, these indicate that the sliding door 4 is locked, that the sliding door 4 is unlocked, that certain actions are undesirable or prohibited (e.g., smoking or telephoning) and that access is not permitted. In one embodiment, a pictogram 23*a* or symbol can be supplemented by text; the text can, for example, be an instruction (e.g., "Please touch," "Please wait," "No access," "Do not disturb" or similar). The name of the user 20, for example, can also be displayed as text. In addition to a pictogram 23*a*, in one embodiment an audible signal and/or a voice message corresponding to the pictogram 23*a* can be initiated.

The size of the cutout or of the control compartment 25 is selected so that the status information 23 can be displayed in a sufficient size to be recognized by the user 20 when he is in front of the sliding door 4. In one embodiment, the size of the cutout is also selected so that the user 20 can insert a hand or one or more fingers into it if he wishes to gain access.

Depending on the area of application, the control compartment 25 can be designed to be vandalism-proof. If the control compartment 25 is designed in the same way as, for example, the remaining surface of the door face 26, for example in the same shade and/or color pattern, the control compartment 25 optically fits into the door face 26; in particular when the light projection device 23 is switched off, the control compartment 25 is inconspicuous and therefore of no interest to vandals. The control compartment 25 can be embedded in the material of the door face 26 (integrally). An opening in the direction of the light projection device 23 can be closed with armored glass in order to protect the light projection device 23 from damage. The control compartment 25 can also be cleaned easily, in particular as an integral design.

In one embodiment, the control compartment 25 can be protected by a cover or locking mechanism. The top or closing mechanism can for example comprise an actuator and a flap or cover; the flap or cover, for example, closes the control compartment 25 and thus prevents a hand or an object from being inserted into the control compartment 25. The actuator can unlock and/or open the flap or cover if necessary so that the control compartment 25 can be used.

The detection device 17 is also shown in FIG. 3. In the embodiment shown, the detection device 17 is arranged in such a way that the fingers of the user 20 that are inserted interrupt the light path of the light barrier. In one embodiment, the light barrier is arranged on vertical side parts in the interior of the control compartment 25; the light path of the light barrier extends in this case from the perspective of the user 20 between a vertical left side part and a vertical right side part. The person skilled in the art recognizes that the light barrier can consist of more than one light source/light receiver pair. The person skilled in the art also recognizes that in one embodiment the detection device 17 can comprise a non-optical detection device (for example a proximity sensor).

Figure 5:
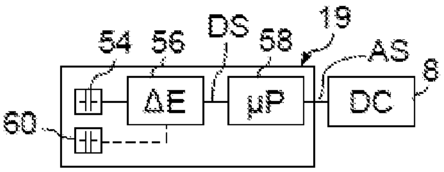
FIG. 5 is a schematic representation of an embodiment of an activation device of a sliding door which is used in the embodiment of an access control system shown in FIG. 1.

FIG. 5 shows a schematic illustration of an embodiment of the activation device 19, which, for example, is directly connected to the controller 8. The activation device 19 comprises a proximity sensor 54, 56 and a processing device 58 connected to it, which is communicatively connected to the controller 8. The proximity sensor 54, 56 comprises a (first) conductive field plate 54 and an evaluation device 56 (ΔE), which is connected to the processing device 58. In one embodiment, the conductive field plate 54 is a copper plate which is arranged in the interior space on the inner door face 26. In this embodiment of the activation device 19, the field plate 54 and the evaluation device 56 form a capacitive sensor, wherein the field plate 54 represents an electrode of an open capacitor. An electric field emanates from the electrode. If a material (the user 20) with a dielectric constant greater than air penetrates the electric field, the capacitance of the field changes as a function of the penetration depth depending on the dielectric constant of this material. The evaluation device 56 measures this change in capacitance, and a detection signal DS resulting therefrom is evaluated in the subsequent signal processing by the processing device 58.

The signal processing compares, for example, the resulting detection signal DS with a specified reference signal. The reference signal defines the depth of penetration (i.e., the proximity of the user 20) from which the sliding door 4 is to be opened. In one embodiment, the resulting detection signal DS has a value which is higher the closer the user 20 or a part of the body (e.g., hand) is to the sliding door 4. If the value of the detection signal DS exceeds a value established by the reference signal, that is to say the user 20 is "close," the processing device 58 generates the activation signal AS. The controller 8 then initiates the movement of the sliding door 4.

Those skilled in the art will recognize that a (second) conductive field plate 60 can be arranged as shown in FIG. 5. In connection with the evaluation device 56, the field plate 60 analogously forms a (second) proximity sensor, which is also a capacitive sensor. In one embodiment, the conductive field plate 60 is also a copper plate which is arranged in the interior on the inner door face 26. The evaluation device 56 can, for example, have a signal input (port) for each field plate 54, 60 in order to determine the changes in capacitance that can be measured. Depending on the configuration, the evaluation device 56 can have one or two (or more) separate signal outputs for the detection signal or signals DS. The processing device 58 is designed to process at least one of the detection signals DS.

This results in different use cases: The field plates 54, 60 of these capacitive sensors can be arranged at different heights on an inside of the inner door face 26. A lower field plate 54, 60 can be provided, for example, to detect the approach of a pet (cat, dog) so that the sliding door 4 is opened for the pet, wherein the opening width can be fixed for the pet. The person skilled in the art recognizes that in one embodiment the pet can additionally be equipped with an RFID transponder. To open the sliding door 4, for example the identifier of the RFID transponder can be recognized and the pet must stay close to the lower field plate 54, 60.

The capacitive sensors, which are formed by the field plates 54, 60 arranged in this way, can be activated individually for use, i.e. one of the capacitive sensors or both of them can be used. For example, if the user 20 does not have a pet but has a small child, only the upper capacitive sensor can be activated for safety reasons. Activation can take place, for example, in that only the upper field plate 54, 60 is connected to the evaluation device 56. As an alternative to this, the lower field plate 54, 60 can also be connected to the evaluation device 56, but the evaluation device 56 is designed (programmed) not to process the associated detection signal DS. In one embodiment, the evaluation device 56 can be programmed in such a way that the detection signal DS associated with the lower field plate 54, 60 is only processed within a certain period of time, e.g., in a period during which the pet is allowed to leave the apartment.

In another application, the field plates 54, 60 of these capacitive sensors can be arranged essentially horizontally next to one another at a defined distance on the inside of the inner door face 26. By means of the capacitive sensors, which are formed by the field plates 54, 60 arranged in this way, the processing device 58 can, for example, detect a direction of movement of the user 20 or a part of the body (e.g., hand). For this purpose, the processing device 58 determines, for example, a time sequence of generated detection signals DS. If the movement takes place for example from left to right, first the electric field of the field plate 54, 60 arranged on the left changes, and then the electric field of the field plate 54, 60 arranged on the right changes. The time sequence of the detection signals DS results in accordance with these field changes. A hand movement from left to right can, for example, cause the sliding door 4 to be opened.

In a further embodiment, several field plates can be arranged, for example, in a scheme of rows and columns, similar to a matrix, for example in the form of a 2×2, 3×3 or 3×4 matrix. The person skilled in the art recognizes that other arrangements are also possible. Each of these field plates generates a detection signal DS when the hand is in its vicinity. A gesture can be recognized by evaluating the time sequence of the detection signals DS.

Further functionalities of the access control system 1 are described by way of example below. The sensor device 10 shown in FIG. 1 is arranged on the end face 30 of the sliding door 4, for example in a region of an upper (corner) edge of the sliding door 4. From this elevated region, the sensor device 10 has an optimized detection field 11 in the direction of the passage region 24 and the floor. An exemplary detection field 11 is shown in FIG. 1 (vertical) and in FIG. 2B (horizontal). The person skilled in the art recognizes that the horizontal detection field 11 can deviate from the shape shown in FIG. 2B, for example it can be narrower. In addition, the sensor unit 10 is better protected in this (upper) region from dirt and damage (e.g., from vandalism).

According to one embodiment of the technology described here, the sensor unit 10 is used to capture a gesture which the user 20 performs when they want to change the opening width W. A change may be desired because the user 20 needs a greater opening width, for example if they are carrying one or more larger objects (e.g., a package, suitcase) or if they are temporarily using a mobility aid (e.g., a wheelchair). The technology described here offers the user 20 the option of changing the opening width as required, in particular to increase it. In another embodiment of the technology, the opening width is selected and stored such that the sliding door 4 initially only opens a gap wide. The gap is so narrow that the user 20 cannot pass through. The opening width (gap width) can also be selected so that the user 20 who is located at the sliding door 4 is in the detection field 11 of the sensor device 10 and the sensor device 10 can detect a gesture by the user 20. If the user 20 then performs a defined gesture, the sliding door 4 opens according to a defined opening width and the user 20 can pass through.

The gesture can include, for example, a movement of the body and/or a body part, for example a movement of the head, an arm, a hand, a leg or a foot. The movement can be directional, e.g., left, right, up, down, or combinations thereof. A person skilled in the art would recognize that another type of gesture can also be defined, e.g., one or more signs (e.g., hand and/or finger signs) or a sequence of such signs. The gesture can be defined so as to be unique to the user 20 or to a user group (e.g., family members or employees of a company).

In one embodiment, the sliding door system 5 can be designed to move the sliding door 4 piece by piece, for example depending on certain gestures. A movement in the direction of the wall shell region 18 opens the sliding door 4 a little. A movement in the direction of the door post 2*a* closes it again a little. In addition, a movement carried out quickly can cause the sliding door 4 to be opened or closed completely.

In one embodiment, a (vertical) height of the user 20 can also be determined using the sensor device 10. In the present description, the term "height" is used for the extension of the user 20 in the direction of the z-axis, even though, for people, their size is usually specified. The height of the user 20 indicates a distance between the floor and a topmost point or region of the user 20. At the moment of determination (measurement moment), the user 20 is on the floor, substantially in the passage region 24. The sensor device 10 has a fixed and known distance from the floor (floor distance). In this situation, according to one embodiment, a user distance between the sensor device 10 and the user 20 is determined. The height H of the user 20 results from a difference between the floor distance and the user distance.

In one embodiment, the sensor device 10 comprises at least one 3D camera. The person skilled in the art recognizes that the sensor device 10 can have more than one 3D camera and/or at least one additional sensor based on a different measuring principle. A camera based on the principle of time-of-flight measurement (TOF sensor) can be used as the 3D camera. The 3D camera comprises a light-emitting diode unit or laser diode device which, for example, emits light in the infrared range, wherein the light is emitted in short pulses (e.g., several tens of nanoseconds). The 3D camera also comprises a sensor group consisting of a number of light-sensitive elements. The sensor group is connected to a processing chip (e.g., a CMOS sensor chip), which determines the time-of-flight of the emitted light. The processing chip simultaneously measures the distance to a number of target points in space in a few milliseconds. The 3D camera can also be based on a measuring principle according to which the time-of-flight of emitted light is captured over the phase of the light. The phase position when the light is emitted and when it is received is compared and the time elapsed or the distance to the reflecting user is determined therefrom. For this purpose, a modulated light signal is preferably emitted instead of short light pulses.

Further details on measurement principles are given, for example, in the following publications: "Fast Range Imaging by CMOS Sensor Array Through Multiple Double Short Time Integration (MDSI)," P. Mengel et al., Siemens AG, Corporate Technology Department, Munich, Germany, and "A CMOS Photosensor Array for 3D Imaging Using Pulsed Laser," R. R. Jeremias et al., 2001 IEEE International Solid-State Circuits Conference, p. 252. The use of a 3D camera to recognize gestures is known from Martin Haker's dissertation, "Gesture-Based Interaction with Time-of-Flight Cameras," University of Lübeck, 2010.

The components mentioned (in particular controller 8, light projection device 13, camera device 3, detection device 17, activation device 19, detection device 14, sensor device 10, interface device 7, drive device 6) are arranged on sliding door 4, if present in one embodiment, and move along with the sliding door 4. These components can be arranged flexibly and as required on the sliding door 4, in particular in its interior; the camera of the camera device 3 is to be arranged, for example, in such a way that it can record an image of the user 20, in particular of his face, through an opening in the outer door face 26. The opening has a diameter of a few millimeters, for example 3-5 mm. The same applies to the light projection device 13, the detection device 17 and the activation device 19, or for their components; they are to be arranged in a user-friendly manner, for example at a height that allows for their perception and/or operation.

In one embodiment, the controller 8 is arranged in a region between the door faces 26, for example in the region of a rear side 31 of the sliding door 4 opposite the end face 30. In one embodiment, the rear side 31 of the sliding door 4 is not visible from the outside because the sliding door 4 can be wider than the passage region 24 and the rear face 31 therefore remains in the wall shell region 18 when the sliding door 4 is in the closed position. The drive device 6 and the interface device 7 can also be arranged in said region. The electrical connections 32, 34 are accordingly arranged between the door faces 26 and are not visible from the outside. However, the embodiments of the technology described here are not restricted to this arrangement of the components, which is mentioned by way of example.

Figure 6:
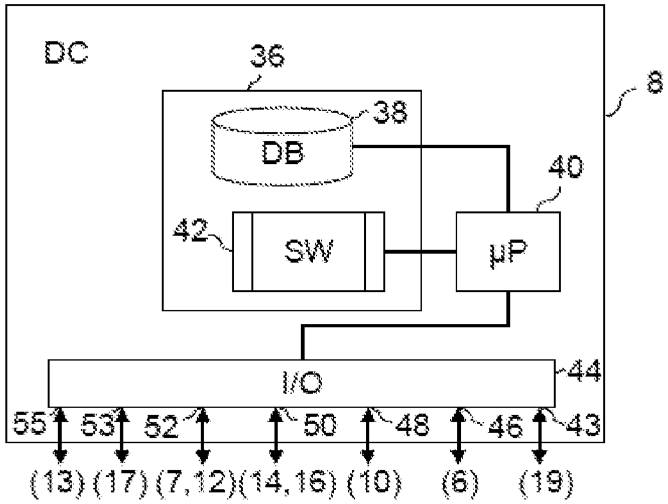
FIG. 6 is a schematic illustration of an embodiment of a controller for the access control system shown in FIG. 1.

FIG. 6 is a schematic illustration of an embodiment of the controller 8 for the access control system 1 shown in FIG. 1. The controller 8 has an interface device 44 (I/O) which is electrically connected to a processor 40 (µP) and has a plurality of terminals 43, 46, 48, 50, 52, 53, 55 for input and output signals. Terminal 46 is connected to the drive device 6, terminal 48 to the sensor device 10, terminal 50 to the recognition device 14 and terminal 52 to the building management system 12 via the interface device 7. In addition, the terminal 43 is connected to the activation device 19, the terminal 53 to the detection device 17 and the terminal 55 to the light projection device 13.

The controller 8 also comprises a storage device 36 which is electrically connected to the processor 40. In the embodiment shown, the storage device 36 has a storage area 38 for a database (DB) and a storage area 42 for one or more computer programs (SW) for operating the sliding door system 5. Depending on the configuration of the access control system 1, the operation of the sliding door system 5 includes one or more of the functions mentioned, for example opening the sliding door 4 as a function of the recognized user 20, displaying the status information 23, detecting a gesture (from outside or inside) and the direction of movement (from the inside). Depending on the design, the operation can also comprise determining a height H of the user 20. The computer program can be executed by the processor 40.

The database stores a record for the user 20 who is authorized to enter the restricted-access area 22. The stored record is also referred to below as a user profile. The user profile includes user-specific data, e. g. name, information relating to credentials (key number, PIN code, access code, including biometric data) and any time restrictions for access (e.g., access from Monday to Friday, from 7:00 to 20:00). If a plurality of users 20 are authorized to enter the restricted-access area 22, the database stores a user profile for each user 20. As an alternative to creating a user profile in the database of the storage device 36, the user profile can be created in a database of the building management system 12, wherein the access control system 1 is able to access said database by means of the communication network 28.

According to the technology described here, each user profile also specifies the width W (see FIG. 2B) up to which the sliding door 4 is to be opened. It is also indicated which gesture or which gestures the user 20 can use to influence the operation of the sliding door 4. In one embodiment, the height H of the user 20 is also specified. The height H of the user 20 can be a maximum height or a height range because the height may vary depending on the type of shoes and headwear the user 20 is wearing. In one embodiment, the length (in the y direction) of each user 20 can also be specified. The height H and the length (if present) are plausibility parameters for the access control, as explained elsewhere in this description.

Figure 7:
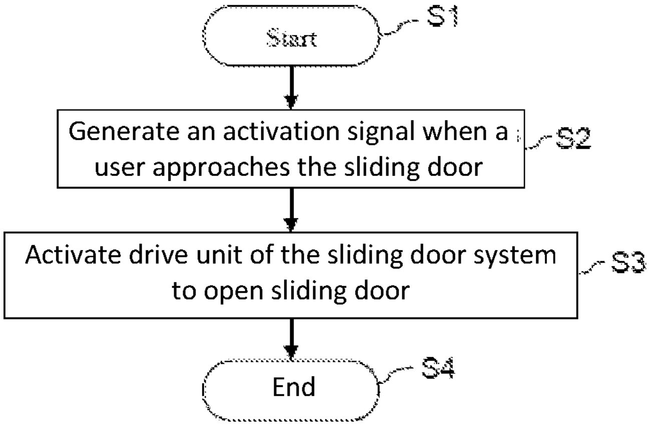
FIG. 7 is a flowchart of an embodiment of a method for operating an access control system.

With an understanding of the basic system components described above and their functions, an exemplary method for operating the access control system 1 based on the situation shown in FIG. 1 is described below in conjunction with FIG. 7. The description is given with reference to the user 20 who, coming from the restricted-access area 22, moves toward the sliding door 4 in order to leave the restricted-access area 22. The method shown in FIG. 4 begins with step S1 and ends with step S4. A person skilled in the art would recognize that the division into these steps is exemplary and that one or more of these steps may be divided into one or more sub-steps or that a plurality of the steps may be combined into one step.

In a step S2, when the user 20 approaches the sliding door 4, the activation device 19 generates an activation signal AS when the user 20 approaches the sliding door up to a specified distance. The specified distance can be selected depending on the spatial conditions in the building, it can be a few 10s of centimeters, for example. The distance is to be chosen so that the user 20 has to take a conscious action to initiate the opening: the user 20 has to, for example, deliberately approach the sliding door 4 or stretch their hand out. This can prevent the sliding door 4 from opening when this is not desired (e.g. because the user 20 was unconsciously in the vicinity or was walking past the sliding door 4).

When an activation signal AS is present, the drive unit 6 of the sliding door system 5 is activated by the controller 8 in a step S3. This causes the sliding door 4 to move from the closed position into an open position.

As stated above, the detection signal DS generated by a proximity sensor 54, 56, 60 is a function of the distance between the user 20 and the sliding door 4. A reference signal is stored in the access control system 1 which is assigned to a specified distance from the sliding door 4. The reference signal can be stored in the processing device 58. In one embodiment, the processing device 58 compares a detection signal DS generated by a proximity sensor 54, 56, 60 to the stored reference signal. The processing device 58 generates the activation signal AS if the comparison shows that the distance of the user 20 is equal to the specified distance.

In one embodiment, the opening can take place in stages, for example to prevent the sliding door 4 from being released for passage (e.g. being opened completely) if the user 20 is unintentionally too close to the sliding door 4. In this embodiment, a first opening width can be selected so that the sliding door 4 initially only opens a gap in a first open position. The gap is so narrow that the user 20 cannot pass through. The opening width (gap width) can also be selected so that the user 20 who is located at the sliding door 4, is in the detection field 11 of the sensor device 10. If the user 20 then performs a defined gesture, the sliding door 4 opens according to a defined opening width and the user 20 can pass through. If no gesture is recognized after a specified period of time, the sliding door 4 closes again.

Depending on the configuration of the access control system 1, the determined gesture can be recognized by the activation device 19 or the sensor device 10. For this, for example, the proximity sensors arranged substantially horizontally next to one another or in the form of a matrix or their field plates 54, 60 can be used. This allows, for example, a hand movement from left to right (or vice versa) to be recognized. Gesture recognition by the sensor device 10 is disclosed elsewhere in this description.

In one embodiment, the controller 8 controls the drive unit 6 in order to move the sliding door 4 back into the closed position after the user 20 has passed. In one embodiment, the closing takes place after a specified period of time has elapsed after the sliding door 4 has reached the open position. It is assumed here that the user 20 has passed the passage region 24 during the specified period of time. In another embodiment, the closing takes place immediately after the user 20 has stepped through the passage region 24. Passing through can for example be detected by means of the sensor device 10.

A person skilled in the art recognizes that the sliding door 4 can be opened according to a defined opening width W. Opening according to the defined opening width W can take place both when leaving the restricted-access area 22 and when entering the restricted-access area 22. The following statements therefore relate to leaving and entering the restricted-access area 22.

The opening width W can be selected based on various motivations. According to one motivation, the opening width W is selected and stored such that the user 20 can comfortably pass through the sliding door 4 or the passage region 24 without feeling restricted or cramped. According to another motivation, the desire of the user 20 for increased security determines the selection of the opening width W. The opening width W is selected such that the sliding door 4 initially only opens a gap wide, one which, however, is too narrow for the user 20.

Controlled by the processor device 40 and taking into consideration the opening width W stored in the user profile, the drive device moves the sliding door 4 until the width W is reached. As a result, the sliding door 4 is moved from the substantially closed position to a more or less open position. Part of the sliding door 4 is pushed into the wall shell region 18 of the door frame 2, as shown for example in FIG. 2B.

As stated above, a gesture made by the user 20 at the sliding door 4 in the detection field 11 of the sensor device 10 is recognized using the sensor device 10. The gesture is recognized according to a method that is described, for example, in the above-mentioned dissertation by Martin Haker.

As a function of the recognized gesture, the drive unit 6 can be controlled in deviation from the stored opening width W. In one embodiment, this means that the sliding door 4 is opened wider than the opening width W appropriate for most everyday situations, so that the user 20 can also pass through with larger objects (e.g., parcel, suitcase) or a wheelchair.

In another embodiment, this means that the sliding door 4 is opened so far that the user 20 can pass only when the correct gesture has been recognized. In one embodiment, if the gesture is not recognized as valid for the user 20, possibly not even after it has been repeated several times, the sliding door 4 is moved back to the closed position. In such a case, for example, a reset procedure can be triggered in which the user 20 has to identify themselves via another communication medium in order to, for example, define a new gesture or trigger a remote opening. In addition, an alarm signal can be generated, which is transmitted to a person responsible for the restricted-access area 22 (tenant, owner, building manager, etc.), for example as a text message via e-mail or SMS.

An alarm signal can also be generated by the controller 8 if the height H of the user 20 in the passage region 24, as determined by the sensor unit 10, deviates from the height H or height range stored for said user 20 by a defined degree. The degree of the deviation can be defined in such a way that it is expressed that the determined height H does not match the user 20 at all (is not plausible). If an expected height H deviates substantially from the currently determined height (based on the user profile), it can be concluded therefrom, for example, that it is not the user 20 to whom the credentials are assigned. It could be the case, for example, that an unauthorized person is in possession of the credentials (e.g., mobile phone, RFID tag) and is trying to gain access instead of user 20.

In the access control system 1, a set of rules can be specified which indicates whether and which action should be triggered after an alarm signal. These actions can be situation-specific, i.e., depending on what time (day or night) and on what day (working day or weekend, vacation time) the alarm signal is generated. Exemplary actions can be: an audible and/or visually perceptible alarm (siren, warning light); automatically notifying security personnel (police or private security service); and automatically notifying a person responsible for the restricted-access area 22 (tenant, owner, building manager, etc.). A person skilled in the art would recognize that these actions can also be combined.

In one embodiment, the controller 8 can be equipped with an additional function that determines a dwell time for the user 20 in the passage region 24 and compares it with a defined dwell time. This function is similar to a function for a security door or elevator door, according to which a signal tone sounds if the door is kept open for too long or is blocked. The defined dwell time can also be stored in the record of the user 20. If the defined dwell time is exceeded, the alarm signal can also be generated. This function makes it possible, for example, to reduce the risk of an unauthorized person blocking the open sliding door 4 or manipulating the sensor device 10.

In a further embodiment the controller 8 can have a further function. This function determines a length of the user 20 (in the y direction) in the passage region 24 and compares it with a defined stored user length range. The sensor device 10, for example designed as a 3D camera comprising a TOF sensor, has the detection field 11 shown in FIGS. 1 and 2B. In conjunction with the controller 8, the length of the user 20 can thus be determined. From an image recording, e.g., a contour of the user 20 can be recognized and their length can be determined therefrom. The defined user length range can also be stored in the record of the user 20. If the defined user length range is exceeded, the alarm signal can also be generated.

Referring again to the positions of the sliding door 4 shown in FIG. 2A-2C, an embodiment of the sliding door system 5 is described below. 2A-2C are each schematic illustrations of a plan view of the sliding door system 5. In each of these top views, the components sensor device 10 (S), controller 8 (DC), and drive device 6 (M) encompassed by the sliding door 4 are shown; other components, such as the interface device 7 and its connection to the building management system 12, are not shown for reasons of illustration. The components, in particular the drive device 6 and the controller 8, are arranged inside the sliding door 4, in particular between the door faces 26. The wall shell region 18 comprising the structure for receiving the sliding door 4 in the open position is also shown in FIG. 2A-2C.

The sensor device 10 is arranged on the end face 30. The arrangement is selected such that the electromagnetic radiation (light or radio waves) can propagate unhindered toward the passage region 24 during operation. The sensor unit 10 can, for example, be inserted in the region of an upper guide rail or into a recess in the end face 30 and protected from damage and dirt by a radiation-permeable cover. The electrical connection 32 (FIG. 1) between the sensor device 10 and the controller 8 and the electrical connection 34 (FIG. 1) extend within the sliding door 4, for example between the door faces 26.

The illustrated embodiment of the sliding door 4 is based on a principle that is similar to a principle known from EP 2876241 A1. Said document describes a sliding door system in which two opposing door surfaces are coupled to an actuator which moves the door surfaces toward or away from one another. In relation to the sliding door system 5 according to the technology described here, this means that the two door faces 26 have a face spacing d1 when the sliding door 4 is in the closed position. During the opening of the sliding door 4, the two door faces 26 are moved toward one another by means of an actuator 9 (FIG. 2A-2C) until they have a face spacing d2 which is dimensioned such that the sliding door 4, when in the fully or partially open position (2B and 2C) thereof, has such a small thickness that it fits into the receiving structure of the wall shell region 18. The leaf spacing d1 is greater than the face spacing d2. If the sliding door 4 is pushed out of the wall shell region 18, the two door faces 26 are moved away from one another (spread apart) such that the sliding door 4 assumes a defined thickness when closed (FIG. 2A). The thickness is determined in such a way that the outer sides of the two door faces 26 in the closed position are substantially flush with the outer sides of the wall shell region 18 or the cladding thereof. As a result, a substantially smooth finish is achieved on both wall sides in the door region.

In one embodiment, the sliding door system 5 has a guide device on a door cross member, which supports the sliding door 4 and guides it on its path between the closed position and the open position. The sliding door 4 has a complementary device on its upper edge. The guide device and the complementary device cooperate when the drive device 6 causes the sliding door 4 to move and acts on the complementary device; they can, for example, form a system having a telescopic extension. The drive device 6 can comprise, for example, a motorized or pneumatic sliding drive which acts on the telescopic extension.

In one embodiment, the two door faces 26 are moved toward or away from one another by the actuator 9. The actuator 9 can comprise a spreading device which is activated mechanically, electrically or electro-mechanically. The spreading device is designed to move the door faces 26 toward one another when the sliding door 4 is to be opened, and to move them away from one another when the sliding door 4 is to be closed. A person skilled in the art would recognize that other spreading devices can also be provided instead, for example cylinders actuated by a pressure medium.

The invention claimed is:

1. A system for controlling access to a restricted-access area in a building, comprising:

a sliding door system which comprises a door frame and a sliding door which can be displaced in the door frame between a closed position and an open position by means of a drive unit, wherein the door frame has a passage region and a wall shell region which at least partially accommodates the sliding door in the open position;

a controller which is arranged on the sliding door and is communicatively connected to the drive unit, wherein the controller is designed to move the sliding door between the closed position and the open position; and an activation device which is arranged in an interior space of the sliding door and is communicatively connected to the controller, the activation device comprising a first proximity sensor and a second proximity sensor, both proximity sensors being mounted horizontally next to each other in the interior space of the sliding door at substantially the same height, wherein the activation device is operable to generate an activation signal based on a time sequence of generated detection signals from the first and second proximity sensors, the activation signal indicating a direction of movement of at least a part of a user, and wherein the controller is operable to move the sliding door from the closed position to the open position in accordance with the activation signal.

2. The system according to claim 1, in which the sliding door has an inner door face facing the restricted-access area and an outer door face facing away from the restricted-access area between which the interior extends, wherein the activation device detects an approach to the inner door face.

3. The system according to claim 1, in which the first proximity sensor has a processing device connected thereto, wherein the processing device is communicatively connected to the controller.

4. The system according to claim 3, wherein the first proximity sensor comprises a first capacitive proximity sensor having a first conductive field plate.

5. The system according to claim 4, in which the first conductive field plate is arranged in the interior space on an inner door face.

6. The system according to claim 4, wherein the second proximity sensor is connected to the processing device.

7. The system according to claim 6, in which the second proximity sensor comprises a second capacitive proximity sensor having a second conductive field plate, wherein the second conductive field plate is arranged in the interior space on an inner door face.

8. The System according to claim 1, wherein the sliding door comprises an actuator which is designed to position two mutually spaced, substantially parallel door faces of the sliding door in a first position relative to each other with a first face spacing (d1) when the sliding door is in the closed position and in a second position relative to each other with a second face spacing (d2) when the sliding door is in the open position, wherein the first face spacing (d1) is greater than the second face spacing (d2).

9. A method for operating a system for controlling access to a restricted-access area in a building according to claim 1, wherein the system comprises the sliding door system and the controller for the sliding door system, the method comprising:

Generating the activation signal (AS) by the activation device which is arranged in the interior space of the sliding door of the sliding door system and communicatively connected to the controller, wherein the activation device (19) is designed to generate the activation signal (AS) when the user who wishes to leave the restricted-access area approaches the sliding door within a specified distance and further wherein the activation signal is based on a time sequence of generated detection signals from the first and second proximity sensors, the activation signal indicating a direction of movement of at least a part of a user; and Controlling the drive unit of the sliding door system by the controller when the activation signal (AS) is present in order to initiate a movement of the sliding door from the closed position to the first open position.

10. The method according to claim 9, further comprising comparing a detection signal (DS) generated by the first proximity sensor, which is a function of the distance of the user to the sliding door, to a reference signal, wherein the reference signal is assigned a specified distance, and wherein the activation signal (AS) is generated when the comparison shows that the distance of the user is equal to the specified distance.

11. The method according to claim 9 further comprising generating a second activation signal when the user executes a specified gesture and activating the drive unit by the controller when the second activation signal (AS) is present to cause a movement of the sliding door from the first open position into a second open position.

* * * * *